United States Patent [19]

McKenzie

[11] Patent Number: 4,983,967
[45] Date of Patent: Jan. 8, 1991

[54] TRANSMISSION OF AUDIO IN A VIDEO SIGNAL

[75] Inventor: Hugh McKenzie, St. Ives, Australia

[73] Assignee: I.R.T. Electronics Pty. Limited, Australia

[21] Appl. No.: 257,736

[22] Filed: Oct. 14, 1988

[30] Foreign Application Priority Data

Oct. 16, 1987 [AU] Australia .............................. PI4929

[51] Int. Cl.$^5$ .......................... H03M 1/00; H04N 9/00
[52] U.S. Cl. ....................................... 341/110; 341/76; 358/145
[58] Field of Search .................. 341/110, 76; 358/145, 358/147, 142, 146, 143, 121

[56] References Cited

U.S. PATENT DOCUMENTS

| | | | |
|---|---|---|---|
| 3,819,852 | 6/1974 | Wolf | 358/145 |
| 4,156,253 | 5/1979 | Steudel | 358/11 |
| 4,266,243 | 5/1981 | Shutterly | 358/145 |
| 4,414,536 | 11/1983 | Sumi | 341/76 |
| 4,752,953 | 6/1988 | Paik et al. | 380/9 |

Primary Examiner—William M. Shoop, Jr.
Assistant Examiner—Sharon D. Logan
Attorney, Agent, or Firm—Ostrolenk, Faber, Gerb & Soffen

[57] ABSTRACT

A method of encoding an audio signal onto and decoding an audio signal from a video signal wherein, in the encoding stage, successive portions of the audio signal are sampled, time compressed and inserted in analogue form into predetermined lines in the vertical interval of each field of the video signal. Also, distortion cancelling signals (which are generated as inverted forms of the time compressed audio signal portions) are inserted in analogue form into further predetermined lines in the vertical interval of each field of the video signal. In the subsequent decoding stage, the successive audio signal portions and the distortion cancelling signals are separated from the video signal, and associated ones of the audio signal portions and the distortion cancelling signals are added after inverting either the audio signal portions or the distortion cancelling signals in order that any perturbation present in both signals will cancel to zero. Thereafter, the resultant signal portions are time expanded and re-assembled.

16 Claims, 4 Drawing Sheets

TRANSMISSION OF AUDIO IN A VIDEO SIGNAL

FIELD OF THE INVENTION

This invention relates to a method signal onto a video signal and, after transmitting or recording the composite signal, decoding the signal in a receiving or playback device. The invention has application in the recording and/or transmission of single-channel or multi-channel high quality audio in unused lines of a video signal, and it has further application in a system in which a video signal is proposed to be used almost entirely as a carrier for audio, with the encoded audio occupying some if not all lines of the video signal.

BACKGROUND OF THE INVENTION

Systems have already developed for keying time compressed audio into unused lines in the vertical interval of a video signal. However, most of the known systems have given rise to poor quality audio reception, particularly when transmitting multi-channel audio, because of difficulties that have been experienced in reconstituting the audio from the discontinuous signals. The present invention has largely overcome these problems with the development of its so-called "VIMCAS" system (disclosed in Australian Patent No. 568443) which accurately synchronises the encoding/decoding of the audio, using the synchronising information and colourburst signal in the video, and which also provides for analogue redundancy in the encoded audio.

However, the prior art systems suffer from the problem of audio distortion caused by the presence of what are herein referred to as "distortion signals" in the audio. These distortion signals may arise from apparatus faults, from reflections in a transmission line, from interference in free space radiation or as a consequence of system switching, to name but a few possible sources.

SUMMARY OF THE INVENTION

The Present invention seeks to obviate or reduce the effects of these problems by providing a system in which distortion signals are cancelled in the decoder by summing inverted and non-inverted signals containing the distortion signals, with at least one of the inverted and non-inverted signals containing the audio of interest.

Thus, the Present invention provides a method of encoding an audio signal onto and decoding an audio signal from a video signal. The method comprises the encoding steps of sampling successive portions of the audio signal, time compressing the sampled audio signal portions, inserting successive ones of the time compressed audio signal portions in analogue form into predetermined lines of the video signal, and inserting a distortion cancelling signal into further predetermined lines of the video signal. Decoding of the audio signal comprises the steps of separating the successive time compressed audio signal portions and the distortion cancelling signals from the video signal, storing successive ones of the audio signal portions, storing successive ones of the distortion cancelling signals, adding associated ones of the stored audio signal portions and distortion cancelling signals in inverted form relative to one another in such a manner that perturbations present in both signals will cancel to zero, time expanding the audio signal portions, and re-assembling the audio signal portions. The step of time expanding the audio signal portions may be effected either prior to or after the storing and adding steps.

PREFERRED FEATURES OF THE INVENTION

The time compressing and expanding operations is normally effected digitally, but the storing and adding of the signals in the decoder may be effected in either a digital or analogue mode.

The distortion cancelling signal may be generated as a pedestal having a duration approximately equal to that of one line of video. Then, if any perturbation is superimposed on the audio during transmission of the signal or as a consequence of a system aberration, it is statistically likely that the same perturbation will also be superimposed on the Pedestal. Therefore, by storing both the audio and the distortion cancelling signal (i.e., the pedestal), by inverting one relative to the other and by adding the two signals, the distortion in the audio will be cancelled.

The method of implementing the invention will depend upon the nature of the system in which the invention is to be used. For example, when line availability is not a problem, successive Portions of the compressed audio may be encoded on at least one line of Predetermined fields of the video signal and the distortion cancelling signal may be inserted into an equal number of lines in the same fields. Alternatively, the compressed audio may be encoded onto at least one line of predetermined fields, while the distortion cancelling signal is inserted into one line of periodically occurring fields. As a further alternative, the compressed audio portions and the audio cancelling signal may be inserted respectively into the same line or lines of alternate fields. In order to improve statistically the chances of distortion cancellation, a total of n+1 lines may be allocated in each field to carry n portions of compressed audio, with the line that is not used to carry the compressed audio being used as the distortion cancelling signal, and that line being shifted such that it is different in successive fields.

As a preferred alternative to the arrangement in which the distortion cancelling signal is generated as a pedestal of duration equal to one line, the distortion cancelling signal may be constituted by a signal which is generated in the encoder as an inverted form of the time compressed audio signal. Then, when the time compressed audio signal portions and the distortion cancelling signals are subsequently inverted (one relative to the other) and added in the decoder, the audio level will be increased by 6dB while any distortions will be cancelled. This approach also has the effect of increasing the signal-to-noise ratio in the event of any random noise being present in the signal.

The invention will be more fully understood from the following description of a Preferred embodiment of a system of encoding and decoding a single channel of audio onto and from a video signal of a type that is generated in a typical PAL system. The description is given with reference to the accompanying drawings.

DETAILED DESCRIPTION OF THE INVENTION

Figure 1:
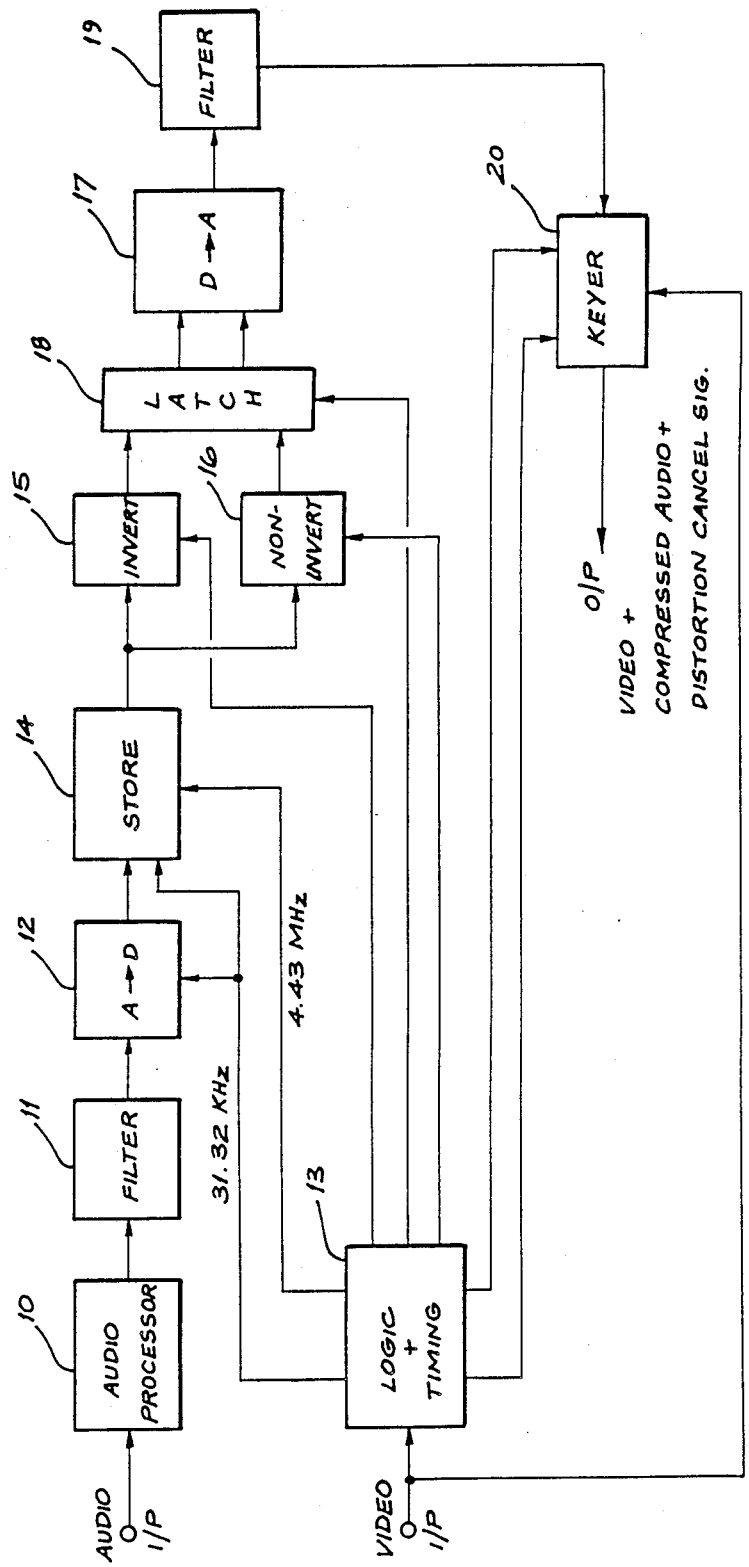
FIG. 1 shows a block diagram of the encoder.

In the encoder as shown in FIG. 1 an input audio signal is first fed to an audio Processor 10 in which the signal is amplified, noise reduced and dynamically compressed. The processed signal is then band limited in a filter 11 and the signal is passed to an analogue-to-digital (A-D) converter 12 where it is converted to digital form.

The A-D converter 12 employs a sample and hold device to provide precise sampling of the input signal, and the sampling rate (corresponding to two times the horizontal rate, 2H is derived from the video signal by way of a logic/timing circuit 13. The digital signal from the A-D converter 12 is then passed, into a digital store 14, again under the control of the logic/timing circuit 13 and at a rate equal to 2H.

Figure 3:
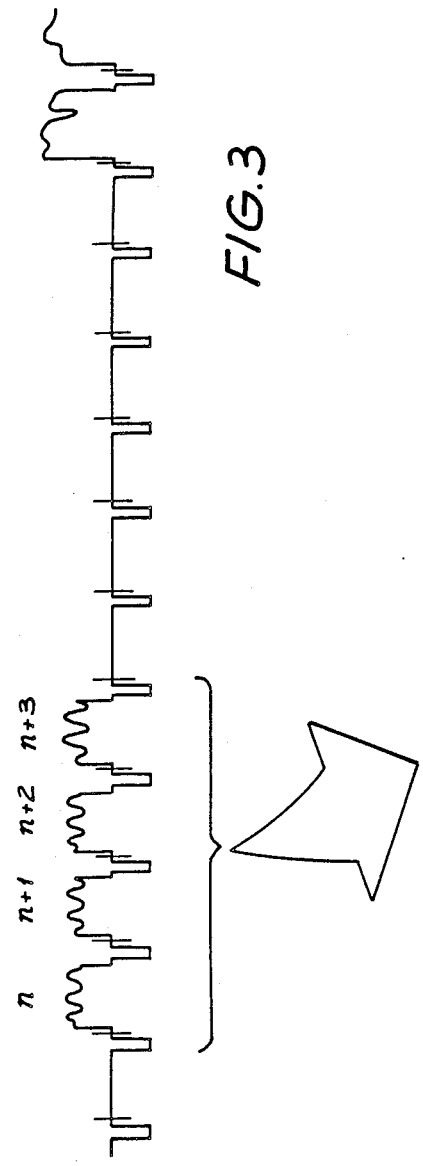
FIG. 3 shows a portion of video signal incorporating one-and-a-bit lines of picture interval and four lines of compressed audio (including two lines of distortion cancelling signal) in the vertical interval that precedes the picture interval.

When a predetermined line arrives on which the audio is to be impressed, say line n, as shown in FIG. 3, a first portion of the digitized audio is applied to the inverting and non-inverting gates 15 and 16. The non-inverting gate 16 is then gated to pass the first portion of the audio to a digital-to-analogue (D-A) converter 17 by way of a latch 18. The resultant analogue signal is then passed through a filter 19 and a keyer 20 and is keyed into line n of the video signal.

Thereafter, when line n+1 arrives the inverting gate 15 is gated to pass an inverted form of the first portion of audio to the D-A converter 17, the resulting analogue signal portion then being keyed into line n+1.

A further samPled Portion of the audio signal is similarly impressed as non-inverted and inverted signal portions on lines n+2 and n+3 respectively of the video signal, and successively sampled portions of the audio are applied in the same manner to lines n to n+3 of subsequent fields of the video signal.

For convenience of reference, the non-inverted signal portions that are impressed on lines n and n+2 are referred to herein as audio signal portions 21 and 21a, while the inverted signal portions that are impressed on lines n+1 and n+3 are referred to as distortion cancelling signals 22 and 22a.

The digitized signal portions are swept out of the store 14 and applied to the inputs of the inverting and non-inverting gates at a rate equal to that of the colourburst sub-carrier. Thus, assuming H equals 15.625kHz and the colourburst sub-carrier frequency is 4.43MHz, the audio signal portions (and the distortion cancelling signals) are time compressed by a factor in the order of 140.

A digitally generated pedestal 23 (FIG. 4) is generated in the logic/timing circuit 13 and is keyed into the video signal by the keYer 20. The Pedestal 23 has an amplitude indicated by the dotted line 24 in FIG. 4 and the leading edge 23 of the pedestal is generated in Phase relationship to the colourburst sub-carrier to provide a timing reference in the decoding of the audio. This accurate timing is essential for achieving registration of the successive portions of compressed audio. The compressed audio and distortion cancelling signals are conveniently added to the video at approximately the same amplitude as that of the pedestal, and the peak-to-peak excursions of the signals are contained between the video blanking level and the Peak white level.

Figure 4:
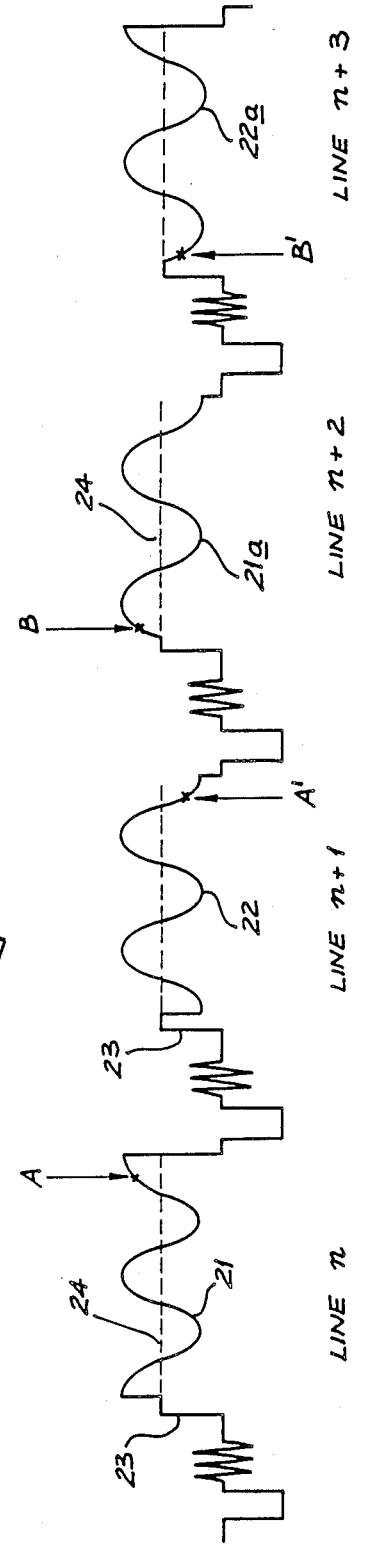
FIG. 4 shows on an expanded scale that portion of the signal that is shown bracketed in FIG. 3.

The keying of the compressed audio signals 21 and 21a and the distortion cancelling signals 22 and 22a into the video signal is controlled by the logic/timing circuit 13 and synchronised with respect to the colourburst sub-carrier. Also, a degree of overlap or redundancy is built into each line of compressed audio and the adjacent lines that contain the distortion cancelling signals, whereby synchronisation is made less critical than it would be without any overlap, and re-construction of the audio as a continuous signal in the decoder is facilitated. Thus, as shown in FIG. 4, the points indicated by the arrows A and B constitute one and the same point on the compressed audio tone which occupies the lines n and n+2, and the points indicated by the arrows $A^1$ and $B^1$ constitute one and the same point on the distortion cancelling signals which occupy the lines n+1 and n+3. The small portions of the respective signals which extend to the right of arrows A and $A^1$ and to the left of arrows B and $B^1$ are effectively redundant.

As described above and shown in FIGS. 3 and 4, the compressed audio and distortion cancelling signals are keyed into successive unused lines in the vertical interval of the video signal. However, it will be understood that the various signals need not be keyed into immediately succeeding lines and that where, for example, multi-channel audio is encoded, the lines which carry audio and distortion cancelling signals associated with one channel may be spaced by a line or two from the lines that carry audio and distortion cancelling signals which are associated with the other channel.

The number of lines required to carry the compressed audio signals and distortion cancelling signals will be dependant on the upper frequency level of the (uncompressed) audio and on the number of channels required to be transmitted. For single-channel audio with an upper frequency level of 14kHz, six lines per field will be required, three to carry the compressed audio signals and three to carry the associated distortion cancelling signals, if a sampling rate of 2H is employed.

Figure 2:
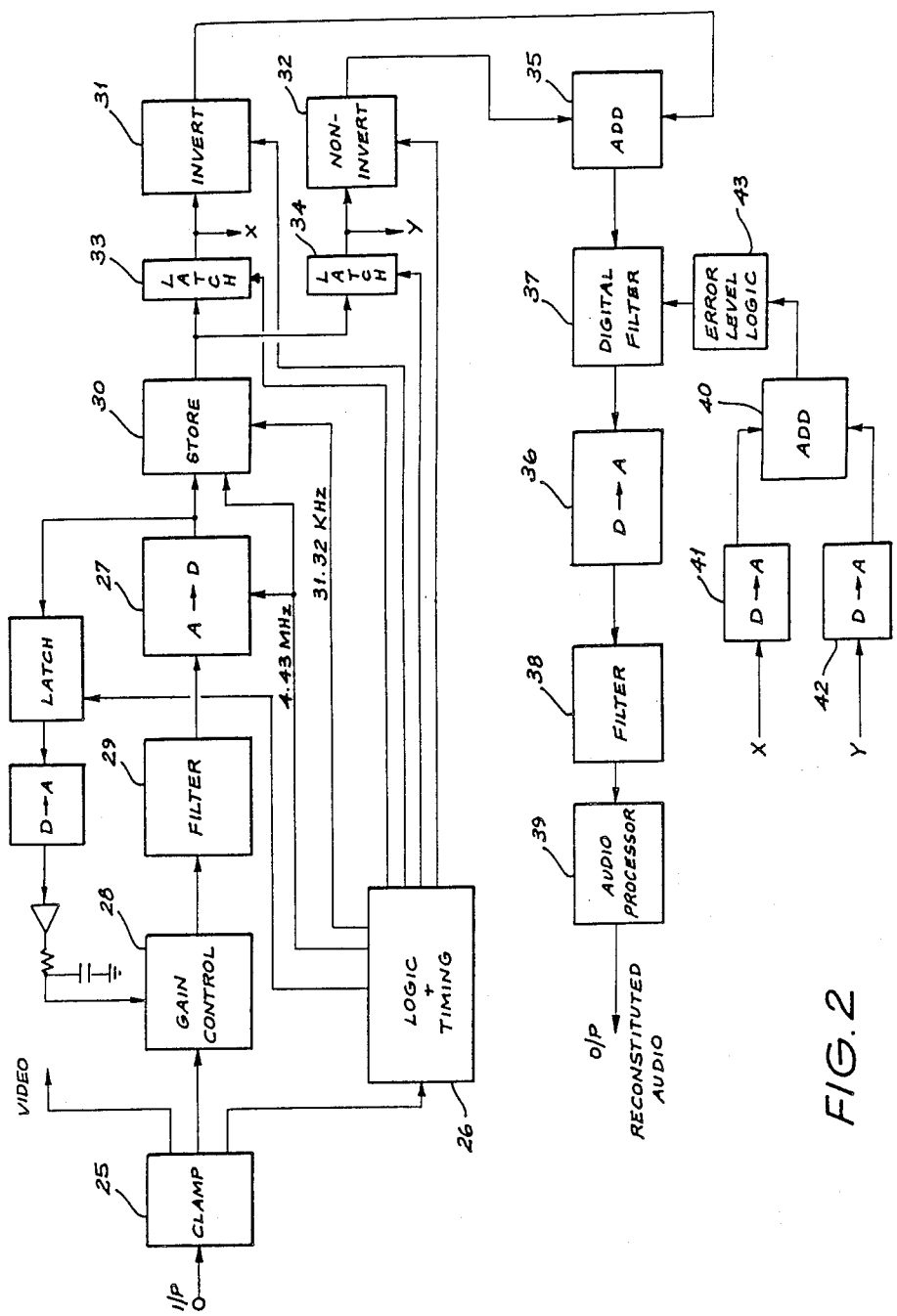
FIG. 2 shows a block diagram of the decoder.

In the decoder as shown in FIG. 2 of the drawings, the video input signal containing the compressed audio and distortion cancelling signals is first processed by a blanking level clamp amplifier 25, whereby the blanking level is set to zero volts and thus, a reference is set to Prevent average picture level changes from altering the reference level for decoding. Three outputs are obtained from the video clamp 25, the first of which is fed to a video timing generator/logic circuit 26 which, in turn, generates synchronisation outputs for use in decoding the audio. The second output is fed to an analogue-to-digital (A-D) converter 27 by way of a gain control and filter circuits 28 and 29, and the third is directed to a video output jack.

The A-D converter 27 is controlled to operate at a Precise samPling rate locked to the colourburst sub-carrier frequency and to digitized the incoming signals. The digitized signal from the A-D converter 27 is stored in a store 30 at the colourburst sub-carrier rate, storage commencing on detection of the pedestal bar 23 (FIG. 4) that precedes the signal, and the digitized signal is time expanded by extracting it from the store 30 at twice the horizontal line rate (2H). The line selection for storage of the digitized samples is controlled by the logic/timing circuitry 26, the lines which are used being determined by the encoder logic. However, because of the redundancy added in the encoder, not all of the samples that are fed to the digital store are required to be further processed. The samples which are most likely to be distorted, due to transient discontinuities, are those at the start of each line, and such samples are discarded prior to expansion and reconstruction of the audio signal.

The successive expanded audio and distortion cancelling signals are fed to non-inverting and inverting gates 31 and 32 by way of latches 33 and 34, and the outputs of the two gates are fed to an adder 35.

The output from the adder 35 is then fed to a digital-to-analogue converter 36, by way of a digital filter 37, and a reconstituted output audio signal is derived by way of a filter 38 and an audio processor 39. The processor 39 functions to complement the operation of the audio processor 10 at the front end of the encoder.

Figure 5:
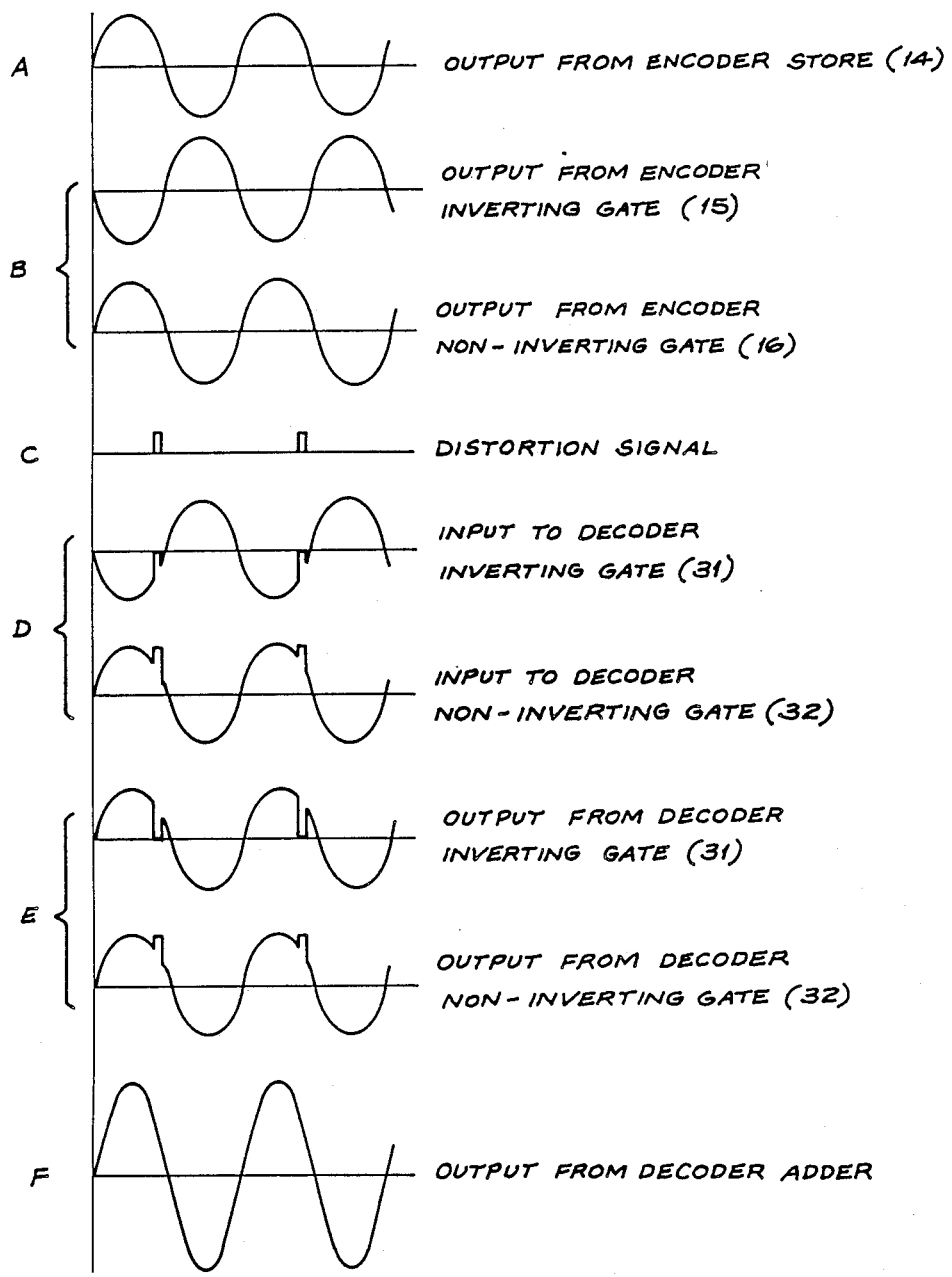
FIG. 5 shows diagrammatic analogue representations of (A) An output signal from a store within the encoder,
(B) Output signals from inverting and non-inverting circuits of the encoder,
(C) A cyclically occuring distortion signal,
(D) Distorted input signals to inverting and non-inverting circuits in the decoder,
(E) Distorted output signals from the inverting and non-inverting circuits in the decoder, and
(F) An outPut signal from a summing circuit in the decoder.

By adding the signals which are derived as outputs from the inverting and non-inverting gates 31 and 32, any perturbations or distortions that occur in both the expanded audio and distortion cancelling signals are summed to zero in the manner which is shown diagrammatically, by the analogue representations of digital signals, in FIG. 5. Also, by adding the two signals the audio level is increased by 6dB. Provision is also made for cancelling the effect of any transient spike which may occur in one or other (but not both) of the expanded audio and distortion cancelling signals. This is achieved by tapping the inputs to the inverting and non-inverting gates 31 and 32, and by adding such signals in an adder 40 after passing them through D-A converters 41 and 42. Any error signal that is derived from the adder 40 as a result of summing the inverted and non-inverted signal inputs is applied to the input of an error level logic circuit 43 which includes a window comparator, and an output from the error level logic circuit is applied to the digital filter 36 for the purpose of removing the distortion that gives rise to the error signal.

Variations and modifications may be made in the invention as above described. For example, whereas the invention has been described with reference to a system in which inverted and non-inverted audio signal portions are impressed on predetermined lines in the vertical interval of each field, with other lines being used to carry picture information in the usual way, the invention does have application to a system in which the audio is impressed on a majority of the lines in each field. Thus, the invention may be used for recording multi-channel compressed audio only onto a video disc using, for example, eight lines of the video signal (four for each of the inverted and non-inverted audio signal portions) per field per channel.

Also, whereas the invention has been described in the context of a system in which distortion cancelling inverted and non-inverted audio signal portions are carried in each field, the system may be adapted such that an audio signal portion is impressed on a pedestal in one or more lines of each field and a pedestal only (without audio) is inserted as a distortion cancelling signal in the same number of lines in the same field. With this arrangement, any perturbation that occurs in the audio will also appear on the audio-free pedestal, and inversion of one or the other will result in cancellation of the distortion when the two signals are summed. However, a disadvantage of this approach is that there will be no increase in the amplitude of the audio signal portion as a consequence of the summing/distortion cancelling step.

In yet another variation of the invention, the audio signal portion may be impressed on a pedestal in one or more lines of succeeding fields and a pedestal without any audio may be inserted in the same line or lines of periodically occurring fields. Thus, the audio signal potions may be inserted in at least one line of n−1 fields and the pedestal alone be inserted in the same line or lines of the nth field. Then, the periodically stored pedestal is then used as a distortion cancelling signal, until such time as it is replaced with a further pedestal bar, and distortion cancelling may then be effected in the same manner as described above.

I claim:

1. A method of encoding an audio signal onto and decoding an audio signal from a video signal, the method comprising the encoding steps of;
   (A) encoding an audio signal onto a video signal, comprising the steps of:
      (1) sampling successive portions of the audio signal;
      (2) time compressing the sampled audio signal portions;
      (3) inserting successive ones of the time compressed audio signal portions in analogue form into predetermined lines of the video signal; and
      (4) inserting distortion cancelling signals into further predetermined lines of the video signal, each distortion cancelling signal being associated with a respective audio signal portion; and thereafter
   (B) decoding the audio signal from the video signal, comprising the steps of:
      (1) separating the successive time compressed audio signal portions and the distortion cancelling signals from the video signal;
      (2) storing successive ones of the audio signal portions;
      (3) storing successive ones of the distortion cancelling signals;
      (4) adding associated ones of the stored audio signal portions and distortion cancelling signals in inverted form relative to one another such that perturbations present in the associated signals will cancel to zero; and
      (5) time expanding and re-assembling the audio signal portions.

2. The method as claimed in claim 1 wherein time expansion of the audio signal portions is effected prior to the step of adding of the audio signal portions and distortion cancelling signals.

3. The method as in claimed in claim 1 wherein the audio signal portions are digitized prior to the time compressing step and wherein the audio signal portions are re-converted to an analogue form prior to the time that the audio signal portions are inserted into the video signal.

4. The method as claimed in claim 1 wherein the audio signal portions are digitized prior to the time expanding step and wherein such portions are re-converted to an analogue form after they are added with the distortion cancelling signals.

5. The method as claimed in claim 1 wherein successive ones of the audio signal portions are inserted in at least one line of successive fields of the video, and wherein successive ones of the distortion cancelling signals are inserted in at least one line of the same field of the video signal.

6. The method as claimed in claim 5 wherein the audio signal portions and the distortion cancelling signals are each inserted in at, least one line in the vertical interval of successive fields of the video signal.

7. The method as claimed in claim 1 wherein the audio signal portions are inserted in at least one line of n−1 fields and wherein the distortion cancelling signals are inserted in the same line or lines of each recurring nth field.

8. The method as claimed in claim 1 wherein the distortion cancelling signal is generated as a pedestal which has a duration approximatelY equal to one line of the video signal.

9. The method as claimed in claim 1 wherein successive ones of the distortion cancelling signals are generated inverted forms of successive ones of the audio portions.

10. The method as claimed in claim 9 wherein associated ones of the audio signal portions and distortion cancelling signals are inserted into proximate lines in respective fields of the video signal.

11. The method as claimed in claim 1 further including the decoding step of adding associated ones of the stored audio signal portions and the distortion cancelling signals in relatively non-inverted form and deriving an error signal as a result of any distortion occurring in one or the other but not both of the audio signal portions and the distortion cancelling signals, and using the error signal to condition the signal which is derived as a result of summing the audio signal portions and the distortion cancelling signals in inverted form.

12. A method of decoding an audio signal which previously has been encoded as a plurality of audio signal portions into predetermined lines of a video signal, each audio signal portion being in the form of an analogue signal in time compressed form, said video signal also having distortion cancelling signals inserted into other predetermined lines of a video signal, each distortion cancelling signal being associated with a respective said audio signal portion; the method comprising the steps of:
(A) separating successive audio signal portions from the predetermined lines in the video signal;
(B) separating from the other predetermined lines in the video signal the distortion cancelling signals;
(C) storing successive ones of the audio signal portions;
(D) storing successive ones of the distortion cancelling signals;
(E) adding associated ones of the stored audio signal portions and distortion cancelling signals in inverted form relative to one another such that perturbations present in both signals will cancel to zero; and
(F) time expanding and re-assembling the audio signal portions.

13. An encoder, comprising:
means for sampling successive portions of an audio signal;
means for time compressing the sampled audio signal portions;
means for inserting successive ones of the time compressed audio signal portions in analogue form into predetermined lines of a video signal; and
means for generating and inserting distortion cancelling signals into further predetermined lines of the video signal.

14. The encoder as claimed in claim 13 wherein the means for generating the distortion cancelling signal includes a circuit which produces an inverted form of successive ones of the time compressed audio signal portions.

15. A decoder, comprising:
means for separating successive time compressed audio signal portions and successive distortion cancelling signals from a video signal;
means for storing successive ones of the audio signal portions;
means for storing successive ones of the distortion cancelling signals in a form which is inverted relative to the audio signal portions;
means for adding associated ones of the stored audio signal portions and distortion cancelling signals that perturbations present in both signals will cancel to zero; and
mans for time expanding and re-assembling the audio signal portions.

16. Apparatus for encoding an audio signal onto and decoding an audio signal from a video signal, said apparatus comprising:
(A) encoding means for encoding an audio signal onto a video signal by:
(1) sampling successive portions of the audio signal;
(2) time compressing the sampled audio signal portions;
(3) inserting successive ones of the time compressed audio signal portions in analog form into predetermined lines of the video signal; and
(4) inserting distortion cancelling signals into further predetermined lines of the video signal, each distortion cancelling signal being associated with respective audio signal portions;
(B) means for decoding the audio signal from the video signal by:
(1) separating the successive time compressed audio signal portions and the distortion cancelling signals from the video signal;
(2) storing successive ones of the audio signal portions;
(3) storing successive ones of distortion canceling signals;
(4) adding associated ones of the stored audio signal portions and distortion cancelling signals in inverted form relative to one another such that perturbations present in the associate signals will cancel to zero; and
(5) time expanding and re-assembling the audio signal portions.

* * * * *